(12) United States Patent
Luo et al.

(10) Patent No.: US 12,474,485 B2
(45) Date of Patent: Nov. 18, 2025

(54) METHOD AND CIRCUIT FOR FREQUENCY COMPENSATION, STORAGE MEDIUM, AND ELECTRONIC DEVICE

(71) Applicant: ZTE Corporation, Shenzhen (CN)

(72) Inventors: Yibao Luo, Shenzhen (CN); Jingbo Wei, Shenzhen (CN); Rong Jia, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 326 days.

(21) Appl. No.: 18/022,348

(22) PCT Filed: Jun. 25, 2021

(86) PCT No.: PCT/CN2021/102499
§ 371 (c)(1),
(2) Date: Feb. 21, 2023

(87) PCT Pub. No.: WO2022/041998
PCT Pub. Date: Mar. 3, 2022

(65) Prior Publication Data
US 2024/0036215 A1    Feb. 1, 2024

(30) Foreign Application Priority Data

Aug. 31, 2020   (CN) .......................... 202010899383.6

(51) Int. Cl.
*G01S 19/40* (2010.01)
*G01S 19/47* (2010.01)
(Continued)

(52) U.S. Cl.
CPC .............. *G01S 19/40* (2013.01); *G01S 19/47* (2013.01); *G01S 19/235* (2013.01); *G01S 19/48* (2013.01)

(58) Field of Classification Search
CPC ........ G01S 19/235; G01S 19/40; G01S 19/47; G01S 19/48
(Continued)

(56) References Cited

U.S. PATENT DOCUMENTS

| 4,318,063 A | 3/1982 | Przyjemski |
| 6,397,146 B1 | 5/2002 | Bruner |

(Continued)

FOREIGN PATENT DOCUMENTS

| CN | 102073055 A | 5/2011 |
| CN | 102135623 A | 7/2011 |

(Continued)

OTHER PUBLICATIONS

International Search Report for PCT/CN2021/102499 filed Jun. 25, 2021; Mail date Sep. 16, 2021.
(Continued)

*Primary Examiner* — Chuong P Nguyen
(74) *Attorney, Agent, or Firm* — CANTOR COLBURN LLP

(57) ABSTRACT

A method and circuit for frequency compensation, a storage medium, and an electronic device, the method including: determining speed information of a terminal device relative to a predetermined device, where the speed information includes acceleration information and vector information; converting the speed information into a first acceleration value corresponding to a Global Positioning System (GPS) device; and compensating a frequency of a crystal oscillator in the terminal device based on the first acceleration value and a second acceleration value, where the second acceleration value is an actual acceleration value of the GPS device determined by the terminal device.

20 Claims, 6 Drawing Sheets

(51) Int. Cl.
*G01S 19/23* (2010.01)
*G01S 19/48* (2010.01)

(58) Field of Classification Search
USPC ............... 342/357.23, 357.3, 357.31, 357.62
See application file for complete search history.

(56) References Cited

U.S. PATENT DOCUMENTS

| | | | | |
|---|---|---|---|---|
| 6,707,346 | B2 * | 3/2004 | Tillotson | ............... G04F 5/06 |
| | | | | 331/158 |
| 7,683,727 | B2 * | 3/2010 | Zubkow | ............... G01C 21/165 |
| | | | | 331/70 |
| 8,552,807 | B2 * | 10/2013 | Ou-Yang | ............... H03L 1/00 |
| | | | | 331/158 |
| 8,643,444 | B2 * | 2/2014 | He | ............... H03L 1/022 |
| | | | | 331/158 |
| 2003/0112086 | A1 | 6/2003 | Tillotson | |
| 2009/0302962 | A1 * | 12/2009 | Ou-Yang | ............... H03L 1/00 |
| | | | | 331/175 |
| 2011/0025427 | A1 | 2/2011 | Ou-Yang | |
| 2012/0065913 | A1 | 3/2012 | Sasaki | |
| 2013/0321048 | A1 | 12/2013 | He | |
| 2023/0221449 | A1 * | 7/2023 | Oshita | ............... G01S 5/017 |
| | | | | 342/357.3 |

FOREIGN PATENT DOCUMENTS

| | | | | |
|---|---|---|---|---|
| CN | 103218061 | A | | 7/2013 |
| CN | 109983703 | A | | 7/2019 |
| CN | 110166044 | A * | 8/2019 | ............. H03L 1/022 |
| CN | 110504957 | A | | 11/2019 |
| CN | 111065937 | A | | 4/2020 |
| CN | 111090109 | A | | 5/2020 |
| CN | 119064030 | A * | 12/2024 | ............. G01P 21/00 |
| EP | 2128644 | A1 * | 12/2009 | ........... G01C 21/165 |
| JP | 2000315121 | A | | 11/2000 |
| JP | 2008060890 | A | | 3/2008 |
| JP | 2009103488 | A | | 5/2009 |
| JP | 2016224204 | A | | 12/2016 |
| JP | 2019191093 | A * | 10/2019 | ............. G01S 19/47 |
| KR | 200361177 | Y1 * | 9/2004 | ............. G01S 19/40 |
| KR | 20060010161 | A | | 2/2006 |
| WO | 2015039330 | A1 | | 3/2015 |

OTHER PUBLICATIONS

Indian Examination Report for corresponding application 202317012070; Report Aug. 19, 2024.
Korean Office Action for corresponding application 10-2023-7000950; Report dated Mar. 13, 2025.
Japanese Office Action for Application No. 2023-501615, dated Jul. 22, 2025, 6 pages with translation.

\* cited by examiner

METHOD AND CIRCUIT FOR FREQUENCY COMPENSATION, STORAGE MEDIUM, AND ELECTRONIC DEVICE

CROSS REFERENCE

This application is a National Stage Filing of the PCT International Application No. PCT/CN2021/102499 filed on Jun. 25, 2021, which claims priority to Chinese Application No. 202010899383.6 filed on Aug. 31, 2020, the entirety of which is herein incorporated by reference.

TECHNICAL FIELD

Embodiments of the present disclosure relate to the field of communications, and in particular, to a method and circuit for frequency compensation, a storage medium, and an electronic device.

BACKGROUND

A Global Positioning System (GPS) is a global positioning system which relies on navigation satellites to perform time measurement and distance measurement, and may provide positioning, timing and speed measurement functions for users.

The GPS technology has been widely and industrially used in many fields including aerospace, aeronautical, nautical, transportation, measurement, exploration, etc. With the development of digital large-scale integrated circuits and the increase in the demand for positioning functions, the GPS technology has become more and more embedded in mobile handheld devices and consumer electronics.

Currently, GPS is already an indispensable function module in a smart phone terminal. With the launch of new generations and models of mobile phones, the function of GPS becomes more and more important. In addition, in order to implement more complicated functions, the new-generation terminals have higher and higher requirements on the accuracy of GPS. In terms of a hardware circuit, the stability of a crystal oscillator greatly affects the accuracy of measurement. Since the crystal oscillator is a heat-sensitive device, the thermal protection for the crystal becomes an important task of hardware design. However, hardware circuits of next-generation terminal devices such as 5G terminal devices are more complicated, and a multi-frequency multi-mode wireless module results in more components generating heat on a motherboard than previous intelligent terminals. This contradiction makes it increasingly difficult to ensure accuracy of the GPS in new-generation mobile phones.

In a mobile phone system, a crystal oscillator is most sensitive to heat conduction. Meanwhile, the crystal oscillator serves as the core of a mobile phone, and the accuracy of the crystal oscillator greatly affects the GPS system which most dependent on the accuracy of the crystal oscillator in the mobile phone system. Hence, in the early planning stage of mobile phone, it is crucial to select an appropriate position on the motherboard for the crystal oscillator, which greatly affects the performance of the GPS on the mobile phone. The failure of the acceleration is actually the performance of the signal in the frequency domain, and if a situation that the signal exceeds the standard occurs, the frequency characteristic of the signal will be deteriorated, i.e., the sensitivity will be deteriorated, thereby causing the deterioration of the performance of the GPS.

For the problem concerning the performance of a GPS in a terminal device in the related art, no effective solution has been proposed.

SUMMARY

Embodiments of the present disclosure provide a method and circuit for frequency compensation, a storage medium, and an electronic device, which may at least solve the problem concerning the performance of a GPS in a terminal device in the related art.

According to the embodiments of the present disclosure, provided is a method for frequency compensation, including: determining speed information of a terminal device relative to a predetermined device, wherein the speed information includes acceleration information and vector information; converting the speed information into a first acceleration value corresponding to a Global Positioning System (GPS) device; and compensating a frequency of a crystal oscillator in the terminal device based on the first acceleration value and a second acceleration value, wherein the second acceleration value is an actual acceleration value of the GPS device determined by the terminal device.

According to the embodiments of the present disclosure, provided is a circuit for frequency compensation, including: a speed sensor, configured to obtain speed information of a terminal device relative to a predetermined device, wherein the speed information includes acceleration information and vector information, and the speed sensor is provided in the terminal device; a main control chip control unit, configured to convert the speed information into a first acceleration value corresponding to a Global Positioning System (GPS) device; and a variable capacitance control unit, configured to compensate a frequency of a crystal oscillator in the terminal device based on the first acceleration value and a second acceleration value, wherein the second acceleration value is an actual acceleration value of the GPS device determined by the terminal device.

According to the embodiments of the present disclosure, also provided is a computer-readable storage medium, wherein the computer-readable storage medium stores a computer program, and the computer program, when being executed by a processor, implements operations in any of the above method embodiments.

According to the embodiments of the present disclosure, also provided is an electronic device, including a memory, a processor, and a computer program stored in the memory and capable of running on the processor, wherein the processor, when executing the computer program, implements operations of in any of the method embodiments.

DETAILED DESCRIPTION

The embodiments of the present disclosure will be described below in detail with reference to the drawings and embodiments.

It should be noted that the terms "first" and "second" in the specification, claims, and accompanying drawings of the present disclosure are used to distinguish similar objects, and are not necessarily used to describe a specific sequence or a precedence order.

Figure 1:
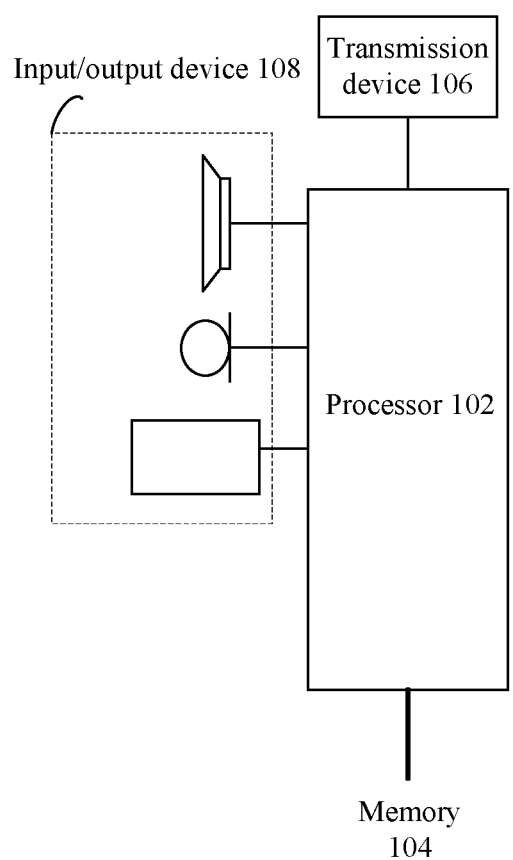
FIG. 1 is a block diagram of the hardware structure of a mobile terminal for implementing a method for frequency compensation according to the embodiments of the present disclosure.

The method embodiments provided in the embodiments of the present disclosure may be implemented in a mobile terminal, a computer terminal, or a similar computing device. Taking operation on a mobile terminal as an example, FIG. 1 is a block diagram of the hardware structure of a mobile terminal for implementing a method for frequency compensation according to the embodiments of the present disclosure. As shown in FIG. 1, the mobile terminal may include one or more (only one is shown in FIG. 1) processors 102 (the processors 102 may include, but are not limited to, a microprocessor (e.g., a Micro-Controller Unit (MCU) or a processing device such as a programmable logic device (e.g., a Field Programmable Gate Array (FPGA)) and a memory 104 configured to store data, wherein the mobile terminal may further include a transmission device 106 responsible for communication function and an input/output device 108. A person having ordinary skill in the art may understand that the structure shown in FIG. 1 is merely exemplary, and does not limit the structure of the foregoing mobile terminal. For example, the mobile terminal may further include more or fewer components than shown in FIG. 1, or have a different configuration from that shown in FIG. 1.

The memory 104 may be configured to store a computer program, for example, a software program and modules of application software, such as a computer program corresponding to the method for frequency compensation in the embodiments of the present disclosure. The processor 102 runs the computer program stored in the memory 104, so as to execute various function applications and data processing, that is, to implement the foregoing method. The memory 104 may include high-speed random access memory, and may also include non-volatile memory, such as one or more magnetic storage devices, flash memory, or other non-volatile solid-state memory. In some instances, the memory 104 may further include a memory remotely located with respect to the processor 102, which may be connected to the mobile terminal over a network. Examples of such network include, but are not limited to, Internet, intranet, local area network, mobile communication network, and combinations thereof.

The transmission device 106 is configured to receive or transmit data via a network. Specific examples of the above network may include a wireless network provided by a communication provider of the mobile terminal. In an example, the transmission device 106 may include a Network Interface Controller (NIC) that may be coupled to other network devices via a base station to communicate with the Internet. In one example, the transmission device 106 may be a Radio Frequency (RF) module configured to communicate with the Internet in a wireless manner.

Figure 2:
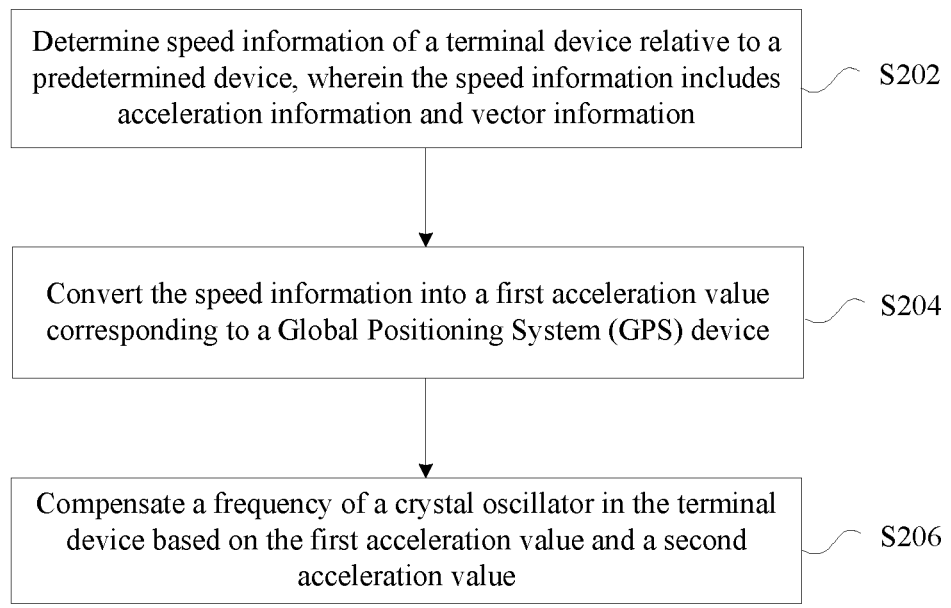
FIG. 2 is a flowchart of a method for frequency compensation according to the embodiments of the present disclosure.

Provided is a method for frequency compensation. FIG. 2 is a flowchart of a method for frequency compensation according to the embodiments of the present disclosure. As shown in FIG. 2, the flow includes the following operations.

At S202, speed information of a terminal device relative to a predetermined device is determined, wherein the speed information includes acceleration information and vector information.

At S204, the speed information is converted into a first acceleration value corresponding to a GPS device.

At S206, a frequency of a crystal oscillator in the terminal device is compensated based on the first acceleration value and a second acceleration value, wherein the second acceleration value is an actual acceleration value of the GPS device determined by the terminal device.

The entity for performing the foregoing operations may be, but is not limited to, a terminal.

In an exemplary embodiment, the crystal oscillator is most sensitive to heat conduction. Meanwhile, the crystal oscillator serves as the core of a mobile phone, and the accuracy of the crystal oscillator greatly affects the GPS system which most dependent on the accuracy of the crystal oscillator in the mobile phone system. Hence, in the early planning stage of mobile phone, it is crucial to select an appropriate position on the motherboard for the crystal oscillator, which greatly affects the performance of the GPS on the mobile phone. The failure of the acceleration is actually the performance of the signal in the frequency domain, and if a situation that the signal exceeds the standard occurs, the frequency characteristic of the signal will be deteriorated, i.e., the sensitivity will be deteriorated, thereby causing the deterioration of the performance of the GPS.

Figure 3:
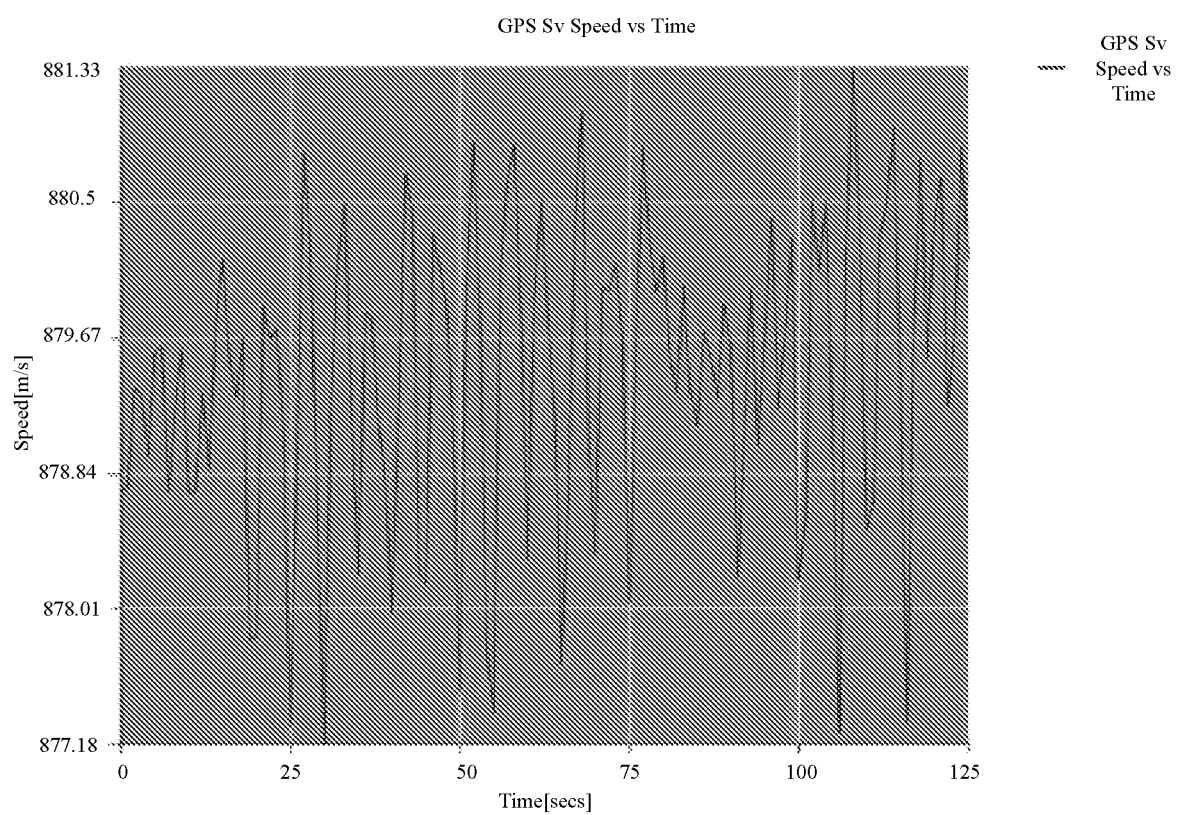
FIG. 3 is a schematic diagram of a relationship between an error frequency and an acceleration error value of a crystal oscillator according to the embodiments of the present disclosure.

The relationship between the error frequency and the acceleration error value of the crystal oscillator is shown in FIG. 3. For the index of the acceleration, it may be known from the Doppler shift equation that fm=the moving speed of the mobile station i/speed of light*(carrier frequency f0=1575.42 MHz), so the acceleration for is equivalent to 1575.42*10^6/3*10^8=5.25 hz/s. When the corresponding relationship between the acceleration value and the frequency is distorted, a frequency synthesis system composed of the crystal oscillator has an error, but these corresponding systems have a linear relationship, and therefore compensation is possible.

By means of the operations, speed information of a terminal device relative to a predetermined device is determined, wherein the speed information includes acceleration information and vector information; the speed information is converted into a first acceleration value corresponding to a GPS device; and a frequency of a crystal oscillator in the terminal device is compensated based on the first acceleration value and a second acceleration value, wherein the second acceleration value is an actual acceleration value of the GPS device determined by the terminal device. In this way, the objective of correcting the acceleration error value of the GPS caused by transient jitter of components generating heat around the crystal is achieved. Therefore, the problem concerning the performance of a GPS in a terminal device in the related art may be solved, and the effect of improving the performance of the GPS in the terminal device may be achieved.

In an exemplary embodiment, the operation of determining the speed information of the terminal device relative to the predetermined device includes:

S1, the acceleration information and the vector information of the terminal device relative to the predetermined device are obtained by using a speed sensor, wherein the speed sensor is provided in the terminal device.

In this embodiment, the acceleration information and the vector direction of the terminal device relative to the earth are calculated. The acceleration information and the vector direction are converted into a tangential acceleration value relative to a GPS satellite, so that the tangential acceleration value may be compared with an actual acceleration value of the GPS calculated by the terminal device, wherein an error value between the tangential acceleration value and the actual acceleration value is a difference value of GPS distortion caused by thermal transient jitter. The difference value is converted into a frequency, and the frequency is compensated in a frequency synthesizer system of the reference crystal oscillator by means of regulation on a circuit, so that a precision error of the GPS caused by the error of the frequency synthesizer system may be compensated.

In an exemplary embodiment, the operation of converting the speed information into the first acceleration value corresponding to the GPS device includes:

S1, the acceleration information and the vector information are converted into a tangential acceleration value relative to the GPS device according to a preset rule, so as to obtain the first acceleration value.

In an exemplary embodiment, the operation of compensating the frequency of the crystal oscillator in the terminal device based on the first acceleration value and the second acceleration value includes:

S1, a difference value between the first acceleration value and the second acceleration value is determined;

S2, the difference value is compared with a preset threshold to obtain a comparison result; and S3, the frequency of the crystal oscillator is compensated based on the comparison result.

In this embodiment, in a case where the frequency corresponding to the first acceleration value is A, the frequency corresponding to the second acceleration value is X, and the preset threshold is C, the comparison result includes X-A<C.

The value of C may be defined as a constant. According to the movement characteristics of the terminal device, a situation of a relatively large movement speed may occur, but a situation that the acceleration is very large and the large acceleration lasts for a long time rarely occurs. The value of C is ±C, representing a range centered on the actually measured value X.

In an exemplary embodiment, the operation of compensating the frequency of the crystal oscillator based on the comparison result includes:

S1, in a case where the difference value is greater than or equal to the preset threshold, a sum value of the second acceleration value and the preset threshold is determined; and S2, the frequency of the crystal oscillator is compensated with the sum value.

In an exemplary embodiment, the operation of compensating the frequency of the crystal oscillator based on the comparison result includes:

in a case where the difference value is less than the preset threshold, the compensation for the frequency of the crystal oscillator is terminated.

Figure 4:
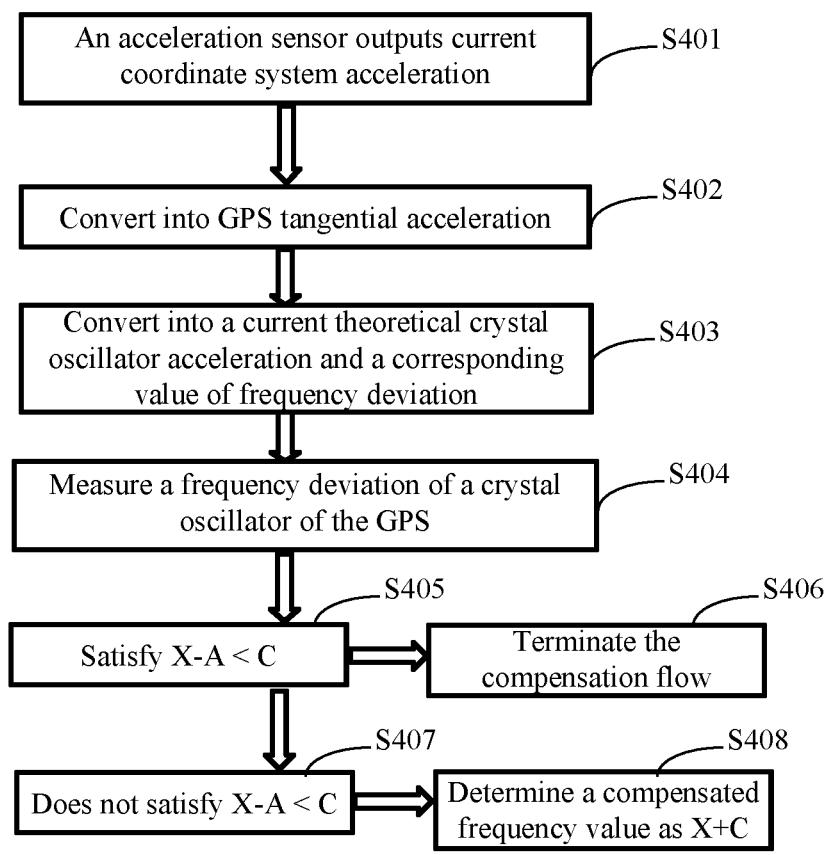
FIG. 4 is a flowchart of frequency compensation according to the embodiments of the present disclosure.

In an exemplary embodiment, as shown in FIG. 4, the frequency compensation in the exemplary embodiment includes the following operations.

At S401, an acceleration sensor outputs current coordinate system acceleration, i.e., the speed information.

At S402, the speed information is converted into tangential acceleration, i.e., a first acceleration.

At S403, the tangential acceleration is converted into a current theoretical crystal oscillator acceleration and a corresponding value of frequency deviation frequency.

At S404, a frequency deviation frequency of a crystal oscillator, i.e., a second acceleration, of a GPS device is measured.

At S405, assuming that the frequency corresponding to the first acceleration value is A, the frequency corresponding to the second acceleration value is X, and the preset threshold is C, in a case where X-A<C is satisfied, the compensation process is terminated (i.e., the flow proceeds to S406).

At S407, in a case where X-A<C is not satisfied, the compensated frequency value is X+A (i.e., the flow proceeds to S408).

Through the description of the foregoing embodiments, a person having ordinary skill in the art may clearly understand that the method according to the foregoing embodiments may be implemented by software in addition to a necessary universal hardware platform, and definitely may also be implemented by hardware. However, in many cases, the former is a preferred implementation. Based on such understanding, the essence of the technical solution of the embodiments of the present disclosure or the part contributing to the related art may be embodied in the form of a software product. The computer software product is stored in a storage medium (such as a ROM/RAM, a magnetic disk, or an optical disk), and includes several instructions for instructing a terminal device (which may be a mobile phone, a computer, a server, or a network device) to execute the methods described in the embodiments of the present disclosure.

A circuit for frequency compensation is also provided in the embodiments of the present disclosure. The circuit is used for implementing the above embodiments and exemplary implementations, and what has been described will not be elaborated. The term "unit", as used hereinafter, is a combination of software and/or hardware capable of realizing a predetermined function. Although the device described in the following embodiments is preferably implemented by software, implementation of hardware or a combination of software and hardware is also possible and conceived.

Figure 5:
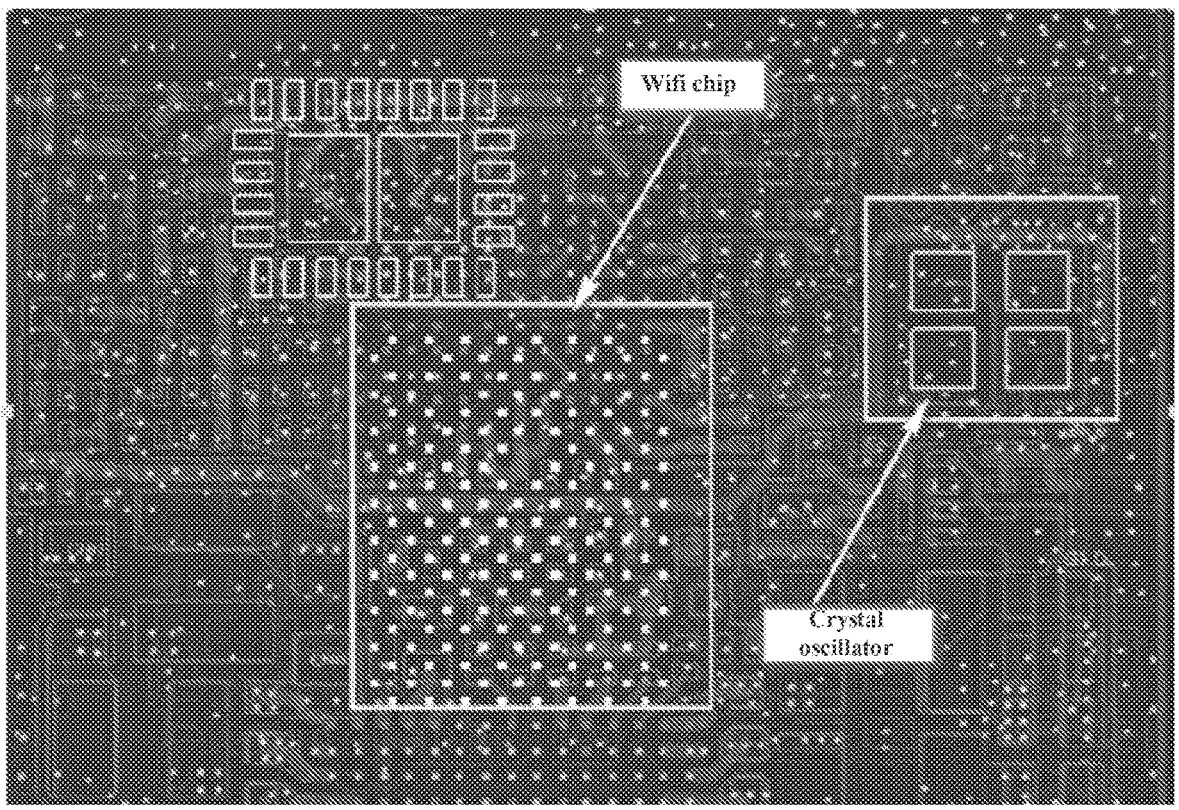
FIG. 5 is a schematic diagram of an impact on a crystal oscillator when a wifi chip is in a standby state and a router is in intermittent standby communication according to the embodiments of the present disclosure.
Figure 6:
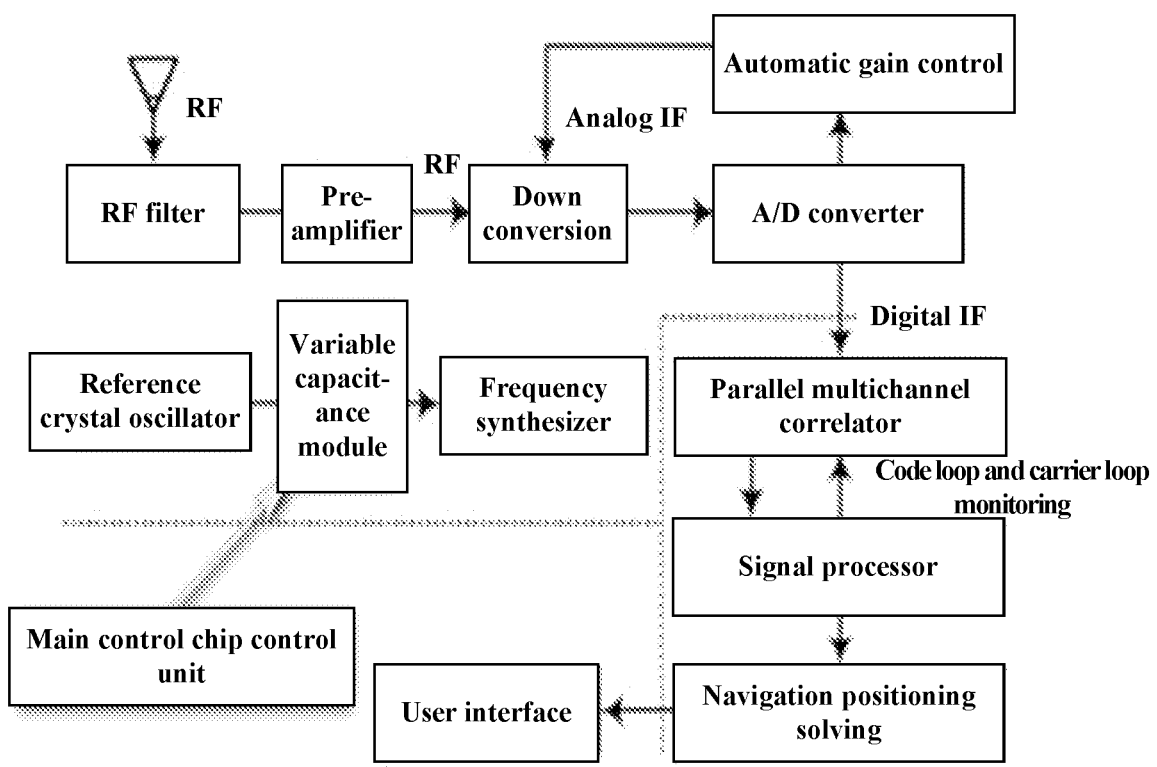
FIG. 6 is a block diagram of a circuit for frequency compensation according to the embodiments of the present disclosure.

FIG. 5 shows an embodiment of an impact on a crystal oscillator when a wifi chip is in a standby state and a router is in intermittent standby communication. As shown in the layout diagram of the main board, the wifi chip is arranged on the back side of the crystal oscillator, and the distance between the devices on the horizontal plane is about 2 mm. When the wifi chip works, the acceleration index of the GPS exceeds a standard. This embodiment explains the current trouble of layout of the motherboard for the crystal oscillator, and this contradiction is more severe on the motherboard of a next-generation 5G terminal device. In order to solve the above technical problem, a circuit for frequency compensation is provided. As shown in FIG. 6, which is a block diagram of a circuit for frequency compensation according to the embodiments of the present disclosure, the circuit includes:

a speed sensor, configured to obtain speed information of a terminal device relative to a predetermined device, wherein the speed information includes acceleration information and vector information, and the speed sensor is provided in the terminal device;

a main control chip control unit, configured to convert the speed information into a first acceleration value corresponding to a GPS device; and a variable capacitance control unit, configured to compensate a frequency of a crystal oscillator in the terminal device based on the first acceleration value and a second acceleration value, wherein the second acceleration value is an actual acceleration value of the GPS device determined by the terminal device.

In an exemplary embodiment, the main control chip control unit is further configured to convert the acceleration information and the vector information into a tangential acceleration value relative to the GPS device according to a preset rule, so as to obtain the first acceleration value.

In an exemplary embodiment, the variable capacitance control unit is further configured to determine a difference value between the first acceleration value and the second acceleration value; compare the difference value with a preset threshold to obtain a comparison result; and compensate the frequency of the crystal oscillator based on the comparison result.

In the above embodiment, an additional variable capacitance control unit (namely, a variable capacitance module) is added to an entire module including the reference crystal oscillator and the frequency synthesizer. This variable capacitance control unit may be added as a peripheral circuit, and may also be integrated in the frequency synthesizer. The main purpose of adding the variable capacitance control unit is to control the frequency finally output by the frequency synthesizer to satisfy error compensation for the actually measured acceleration value of the GPS.

The main control chip control unit may be integrated in a processor of the mobile phone, or may be an independent control chip. The main control chip control unit is mainly responsible for processing and conversion of an output value of an acceleration sensor, i.e., all the processes of FIG. 4, and then controlling the operation of the variable capacitor module by means of an output control signal containing a voltage control (but not limited to the voltage control, and may also be digital control such as i2C, SDI and mipi control) so as to compensate for an error of the actually measured acceleration value of the GPS. The compensation is compensation of crystal oscillator hardware, which is different from compensation and correction on software. The compensation of crystal oscillator hardware can fundamentally solve the influence of a thermal transient on the crystal oscillator, is effective and simple, and will not bring about other error components as software compensation does.

It should be noted that each module may be implemented by software or hardware. The latter may be implemented in the following manner, but is not limited thereto. All the modules are located in a same processor; alternatively, the modules are located in different processors in an arbitrary combination.

The embodiments of the present disclosure further provide a computer-readable storage medium. The computer-readable storage medium stores a computer program, wherein the computer program is configured to execute the operations in any one of the method embodiments during running.

In an exemplary embodiment, the computer-readable storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure also provide an electronic device, including a memory and a processor, wherein the memory stores a computer program, and the processor is configured to run the computer program so as to execute the operations in any one of the method embodiments.

In an exemplary embodiment, the electronic device may further include a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those having ordinary skill in the art should understand that each module or each operation of the embodiments of the present disclosure may be implemented by a universal computing device, and the modules or operations may be concentrated on a single computing device or distributed on a network formed by a plurality of computing devices, and may be implemented by program codes executable for the computing devices, so that the modules or operations may be stored in a storage device for execution with the computing devices. The shown or described operations may be executed in sequences different from those described here in some cases, or may form each integrated circuit module respectively. Multiple modules or operations therein may form a single integrated circuit module for implementation. Thus, the present disclosure is not limited to any particular combination of hardware and software.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

What is claimed is:

1. A method for frequency compensation on a terminal device, comprising:
   determining, by a speed sensor provided in the terminal device, speed information of the terminal device relative to the Earth, wherein the speed information comprises acceleration information and vector information;
   converting, by a main control chip control unit provided in the terminal device, the speed information into a first acceleration value relative to a Global Positioning System (GPS) satellite; and
   compensating, by a variable capacitance control unit provided in the terminal device, a frequency of a crystal oscillator in the terminal device based on the first acceleration value and a second acceleration value, wherein the second acceleration value is an actual acceleration value of the GPS satellite measured by the terminal device.

2. The method according to claim 1, wherein determining, by the speed sensor provided in the terminal device, the speed information of the terminal device relative to the Earth comprises:
   obtaining the acceleration information and the vector information of the terminal device relative to the Earth by using the speed sensor.

3. The method according to claim 1, wherein converting, by the main control chip control unit provided in the terminal device, the speed information into the first acceleration value relative to the GPS satellite comprises:

converting the acceleration information and the vector information into a tangential acceleration value relative to the GPS satellite, so as to obtain the first acceleration value.

4. The method according to claim 1, wherein compensating, by the variable capacitance control unit provided in the terminal device, the frequency of the crystal oscillator in the terminal device based on the first acceleration value and the second acceleration value comprises:
  determining a difference value between the first acceleration value and the second acceleration value;
  comparing the difference value with a threshold to obtain a comparison result; and
  compensating the frequency of the crystal oscillator based on the comparison result.

5. The method according to claim 4, wherein compensating the frequency of the crystal oscillator based on the comparison result comprises:
  in a case where the difference value is greater than or equal to the threshold, determining a sum value of the second acceleration value and the preset threshold; and
  compensating the frequency of the crystal oscillator with the sum value.

6. The method according to claim 4, wherein compensating the frequency of the crystal oscillator based on the comparison result comprises:
  in a case where the difference value is less than the preset-threshold, terminating the compensation for the frequency of the crystal oscillator.

7. The method according to claim 4, wherein the threshold is a constant.

8. The method according to claim 4, wherein the preset threshold is a range centered on the actual acceleration value of the GPS satellite measured by the terminal device.

9. A non-transitory computer-readable storage medium, wherein the computer-readable storage medium stores a computer program, and the computer program, when being executed by a processor, implements operations of the method according to claim 1.

10. An electronic device, comprising a memory, a processor, and a computer program stored in the memory and capable of running on the processor, wherein the processor, when executing the computer program, implements operations of the method according to claim 1.

11. A circuit for frequency compensation, comprising:
  a speed sensor, configured to obtain speed information of a terminal device relative to the Earth, wherein the speed information comprises acceleration information and vector information, and the speed sensor is provided in the terminal device;
  a main control chip control unit, configured to convert the speed information into a first acceleration value relative to a Global Positioning System (GPS) satellite; and
  a variable capacitance control unit, configured to compensate a frequency of a crystal oscillator in the terminal device based on the first acceleration value and a second acceleration value, wherein the second acceleration value is an actual acceleration value of the GPS satellite measured by the terminal device.

12. The circuit according to claim 11, wherein the main control chip control unit is further configured to convert the acceleration information and the vector information into a tangential acceleration value relative to the GPS satellite, so as to obtain the first acceleration value.

13. The circuit according to claim 11, wherein the variable capacitance control unit is further configured to determine a difference value between the first acceleration value and the second acceleration value; compare the difference value with a threshold to obtain a comparison result; and compensate the frequency of the crystal oscillator based on the comparison result.

14. The circuit according to claim 13, wherein the variable capacitance control unit is further configured to, in a case where the difference value is greater than or equal to the threshold, determine a sum value of the second acceleration value and the threshold; and compensate the frequency of the crystal oscillator with the sum value.

15. The circuit according to claim 13, wherein the variable capacitance control unit is further configured to, in a case where the difference value is less than the threshold, terminate the compensation for the frequency of the crystal oscillator.

16. The circuit according to claim 11, wherein the variable capacitance control unit is added to an entire module comprising a reference crystal oscillator and a frequency synthesizer of the terminal device.

17. The circuit according to claim 16, wherein the variable capacitance control unit is added as a peripheral circuit.

18. The circuit according to claim 16, wherein the variable capacitance control unit is integrated in the frequency synthesizer.

19. The circuit according to claim 11, wherein the main control chip control unit is integrated in a processor of the mobile terminal.

20. The circuit according to claim 11, wherein the main control chip control unit is an independent control chip.

* * * * *